Figure 5:
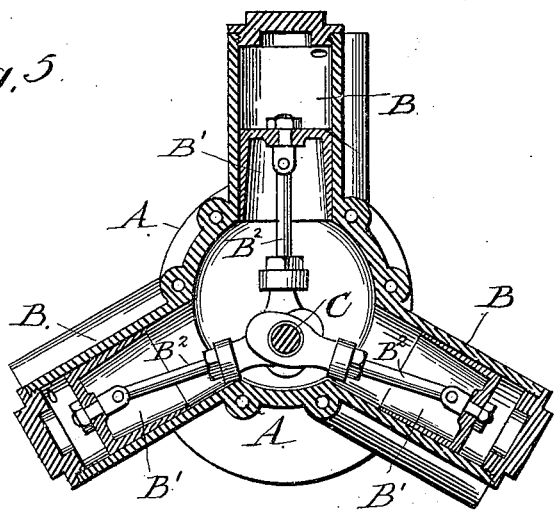

No. 663,561. Patented Dec. 11, 1900.
G. W. CONSTANTINE.
HOG DRESSING TOOL.
(Application filed June 18, 1900.)
(No Model.) 2 Sheets—Sheet 1.
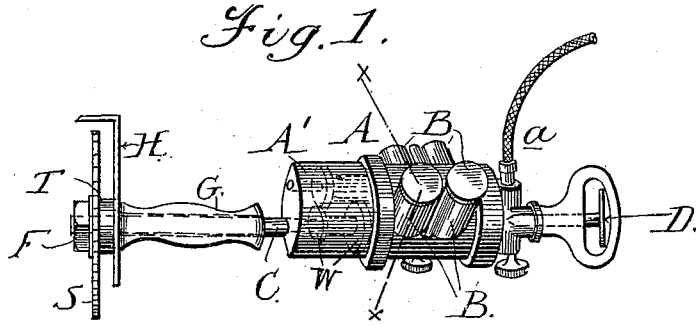
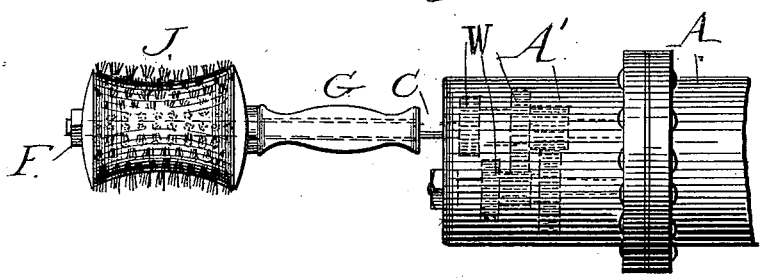
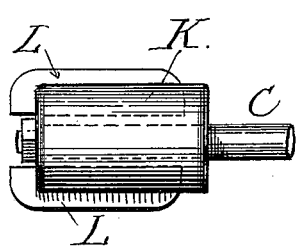
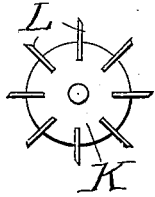
WITNESSES
C. W. Fowler
G. M. Copenhaver
INVENTOR
George W. Constantine
by T. Walter Fowler
his Attorney No. 663,561. Patented Dec. 11, 1900.
G. W. CONSTANTINE.
HOG DRESSING TOOL.
(Application filed June 18, 1900.)

(No Model.) 2 Sheets—Sheet 2.

WITNESSES

INVENTOR
George W. Constantine
by P. Walter Fowler
his Attorney

UNITED STATES PATENT OFFICE.

GEORGE W. CONSTANTINE, OF CHICAGO, ILLINOIS, ASSIGNOR OF ONE-HALF TO ALONZO N. BENN, OF SAME PLACE.

HOG-DRESSING TOOL

SPECIFICATION forming part of Letters Patent No. 663,561, dated December 11, 1900.

Application filed June 18, 1900. Serial No. 20,731. (No model.)

*To all whom it may concern:*

Be it known that I, GEORGE W. CONSTANTINE, a citizen of the United States, residing at Chicago, in the county of Cook and State of Illinois, have invented new and useful Improvements in Pneumatic Appliances, of which the following is a specification.

This invention relates to rotary butchering devices operated by air-pressure and especially desirable and useful in the machines designed for scraping and brushing and dismembering the carcasses of hogs.

In hog-scraping machines and apparatus the scraping appliances do not always remove all of the adhering hair, as portions of the carcass, like the hams, flanks, and fore legs, are not perfectly acted on by the scrapers. Therefore these parts still have hair adhering to them after the carcass has passed through the scraping-machine or mechanism proper. Ordinarily operators are appropriately stationed and supplied with hand-scrapers and knives to remove the hair remaining on the carcass; but this operation is slow and expensive and greatly adds to the cost of the final product.

The object of the present invention is to facilitate the removal of the remaining hair from parts of the carcass alluded to and the cutting up of the carcass and to supply the operators with effective hand implements which are rotatively driven at high speed by pneumatic pressure.

In the accompanying drawings, in which similar letters of reference indicate corresponding parts, Figure 1 represents a rotary pneumatic motor having a head provided with a circular saw-blade and guard therefor. Fig. 2 illustrates the head of this motor provided or formed with a rotary brush or scrubber. Fig. 3 is a modification illustrating radial knives or blades secured to the head. Fig. 4 is an end view of Fig. 3. Fig. 5 is an enlarged cross-section of the motor on the line *x x* of Fig. 1.

In the said drawings I have illustrated the motor as of the class of air-engines of multiple-cylinder type adapted for the economical and efficient introduction of a fluid-pressure medium behind reciprocating pistons which are connected to a crank-shaft and by means of which and speed-gearing the operating-shaft of the engine is capable of a high rate of speed.

The casing A is formed or provided with fluid-pressure cylinders B, arranged radially and each in practice provided with reciprocating pistons B', provided with rods B², adapted to connect with and operate a driving-shaft C in any well-known manner. The forward portion A' of the casing contains any suitable arrangement of speed-gearing W, (shown generally by dotted lines in Figs. 1 and 2,) while at the opposite end of the casing is a pipe *a* or means for connection with a hose or tube forming a member of a properly-installed fluid-pressure plant. As far as described the motor is of a well-known type and I lay no claim to its general organization.

To adapt the motor to the special use noted, I form or provide the rear end of the casing with an open handpiece or grip to facilitate the rapid and convenient hand manipulation of the device, and the fluid-pressure inlet is controlled by a throttle-valve D, the stem of which projects through the hub of the handle or grip and into the open center thereof, so that it may be conveniently engaged to operate the valve.

From the forward end of the casing the driving-shaft extends, and upon its outer end is to be fitted a tool of some character adapted for the work in hand. In Fig. 1 I illustrate this tool as a circular saw-blade S, fitted to the shaft and held against a collar or sleeve T thereon and a nut F on the outer threaded end of the shaft. On said shaft is also placed a loose handpiece or grip G, which the operator grasps to direct the cutting action of the saw, and between the forward end of this handpiece or grip and the saw-blade is a guard or shield H for protecting the hand of the operator from possible injury by the saw. The motor is light in weight and can be easily manipulated and turned into any position and the saw directed to properly cut the meat and bones necessary in dismembering the carcass for commercial purposes.

Owing to the extension of the shaft C it should have a bearing at some point beyond the casing. Therefore the handle G serves the additional useful purpose of a long bearing for the shaft, and when grasped by the operator this handle not only positions the tool, but also resists the tendency of the shaft to being sprung out of its true position when the tool is hard pressed against the carcass.

In Fig. 2 I illustrate as a tool a wire brush J, which is to be secured to the driving-shaft in place of the saw, and its essential object is to facilitate the removal of hair on inaccessible places on the carcass—as, for instance, on the hams, flanks, and fore legs—and which places are not thoroughly scraped by the hog-scraping machine through which the carcass passes after coming from the scalding-vat.

The device being a hand implement, it may be successfully applied to and made to operate upon parts of the carcass that are not touched by the component parts of the usual hog-scraping machine and to parts which often baffle the efforts of skilled labor using ordinary scraping-knives.

The driving-shaft and its tool are designed to rotate at a high speed—say fifteen hundred revolutions per minute—and the device has proved very effective and economical in actual operation and far superior in results to the hand implements heretofore used in packing-houses and elsewhere for the purpose, as it greatly facilitates the operations and performs thorough and satisfactory work.

In whatever form the tool of the air-driven motor is made there is produced a rotatable pneumatically-driven implement or device which is of great aid in the manipulations attending the dressing and dismembering of the carcasses of animals intended for the commercial markets.

In Figs. 3 and 4 I illustrate the head K as provided with radially-arranged scraping-blades L, which may also be used without departing from the spirit of my invention.

Having thus described my invention, what I claim as new, and desire to secure by Letters Patent, is—

1. A pneumatic butchering appliance including a fluid-pressure motor, a rigid driving-shaft extending from one end thereof, a tool or implement mounted directly on the shaft, and a grip or handle loose on said shaft between the tool and the motor-casing, and serving as a bearing for the shaft and as a means for positioning the tool with relation to the carcass.

2. A pneumatic butchering device including a fluid-pressure motor having a driving-shaft extending from one end, a tool or implement removably fitted to said shaft and rotated thereby, a grip or handpiece on the extended portion of the shaft back of the tool, and a shield or guard between the tool and handpiece.

3. A pneumatic butchering device including a fluid-pressure motor having a driving-shaft extending from one end, a tool including a brush fixed to said shaft and rotated thereby, a handle or grip on the shaft between the tool and the end of the motor-casing for positioning the tool with relation to the carcass, and means carried by the motor and including a rigid handle at the opposite end of the casing and a throttle-valve having a stem extending through the rigid handle for controlling the fluid-pressure.

4. A pneumatic butchering device including a fluid-pressure motor having an extended driving-shaft, a handle or grip loose on the shaft and adapted to be grasped to position the tool with respect to the carcass, a second handle or grip on the opposite portion of the motor and having an open center, and a throttle-valve having a stem mounted in the second handle for controlling the fluid-pressure to the motor.

In testimony whereof I have hereunto set my hand in presence of two subscribing witnesses.

GEORGE W. CONSTANTINE.

Witnesses:
CHAS. COLBURN,
BERT C. COCHRAN.